United States Patent
Usui et al.

(10) Patent No.: US 12,116,513 B2
(45) Date of Patent: Oct. 15, 2024

(54) ADHESION/PEELING METHOD, AND ADHESION/PEELING DEVICE

(71) Applicant: KABUSHIKI KAISHA TOSHIBA, Tokyo (JP)

(72) Inventors: Takashi Usui, Saitama Saitama (JP); Tetsuya Kugimiya, Kawasaki Kanagawa (JP); Kazuo Watabe, Yokohama Kanagawa (JP); Keisuke Ueno, Kawasaki Kanagawa (JP); Hidefumi Takamine, Tokyo (JP); Junko Hirokawa, Tokyo (JP); Yongfang Li, Kawasaki Kanagawa (JP); Yuki Ueda, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 172 days.

(21) Appl. No.: 17/929,431

(22) Filed: Sep. 2, 2022

(65) Prior Publication Data
US 2023/0295474 A1    Sep. 21, 2023

(30) Foreign Application Priority Data
Mar. 18, 2022    (JP) .................. 2022-044699

(51) Int. Cl.
*C09J 9/02*    (2006.01)
(52) U.S. Cl.
CPC .......... *C09J 9/02* (2013.01); *C09J 2301/502* (2020.08)
(58) Field of Classification Search
CPC ....................................................... C09J 9/02
See application file for complete search history.

(56) References Cited

U.S. PATENT DOCUMENTS 11,279,855 B2 *   3/2022   Akamatsu ............... C09J 11/06
2018/0265750 A1 *  9/2018   Akamatsu ............... C09J 11/04
(Continued)

FOREIGN PATENT DOCUMENTS

JP       2010-37354 A       2/2010
WO    WO 2021/166803 A1    8/2021

OTHER PUBLICATIONS

Takamine et al., U.S. Appl. No. 17/897,451, filed Aug. 29, 2022.
Tetsuo Makita, "The Basic Electrical Characteristics of the Concrete," J. IEIE Jpn., vol. 29, No. 9, pp. 783-788 (2009).

*Primary Examiner* — Mark Kopec
*Assistant Examiner* — Jaison P Thomas
(74) *Attorney, Agent, or Firm* — Finnegan, Henderson, Farabow, Garrett & Dunner, LLP (57) ABSTRACT

An adhesion/peeling method according to an embodiment includes adhering a first surface side of an electrically peelable adhesive sheet to a predetermined position of a fixation target object, wherein the electrically peelable adhesive sheet is formed of an electro-peeling adhesive having adhesiveness on the first surface side and a second surface side thereof, and the adhesiveness of the electro-peeling adhesive is lowered due to an input of a voltage; adhering a first electrode of an adherend including the first electrode formed of a conductor to the second surface side of the electrically peelable adhesive sheet; containing a liquid at the predetermined position of the fixation target object to temporarily form a second electrode with conductivity on a surface of the fixation target object; and inputting a predetermined voltage between the first electrode and the second electrode to peel of the electrically peelable adhesive sheet from the fixation target object.

6 Claims, 6 Drawing Sheets (56) References Cited

U.S. PATENT DOCUMENTS

| | | | | |
|---|---|---|---|---|
| 2022/0411673 | A1* | 12/2022 | Stapf | ..................... B32B 43/006 |
| 2023/0159799 | A1* | 5/2023 | Akamatsu | ............... B32B 15/09 |
| | | | | 428/344 |
| 2023/0167339 | A1* | 6/2023 | Akamatsu | .............. C09J 201/00 |
| | | | | 428/425.8 |
| 2023/0407150 | A1* | 12/2023 | Stapf | ....................... C09J 11/06 |

* cited by examiner

ADHESION/PEELING METHOD, AND ADHESION/PEELING DEVICE

This application is based upon and claims the benefit of priority from Japanese Patent Application No. 2022-044699, filed Mar. 18, 2022; the entire contents of which are incorporated herein by reference.

FIELD

Embodiments of the present disclosure relate to an adhesion/peeling method, and an adhesion/peeling device.

BACKGROUND

For example, when temporarily adhering a sensor to the concrete, an adhesive, a double-sided tape, or the like is generally used. However, when the sensor is peeled off, it is possible that the adhesive or the double-sided tape remains as a residue on the concrete side. When an article to be adhered is temporarily adhered to a fixation target object and then removed again, it is desirable that no residue such as the adhesive or the like remains on the fixation target object.

In recent years, adhesives that can be easily peeled off from the adherend by applying voltage have been put to practical use. According to the technique, both the fixation target object and the adhesion target object have to be conductive, and the application range is limited.

DETAILED DESCRIPTION

Hereinafter, an adhesion/peeling method and an adhesion/peeling device according to an embodiment will be described with reference to the figures.

First Embodiment

In order to inspect a condition of a concrete structure, a sensor is adhered to a surface of the structure, and after the inspection is completed, the sensor is peeled off and the restoration to the original state is performed. The adhesion/peeling method according to the embodiment is a method applied in such a case, and after temporarily adhering an adherend to a fixation target object, the method is performed to peel off the non-adhered object from the fixation target object. The concrete is a building material made by mixing cement with water, sand, and gravel. The concrete has good insulating properties in a dry state. The concrete is porous and impregnated with water.

Figure 1:
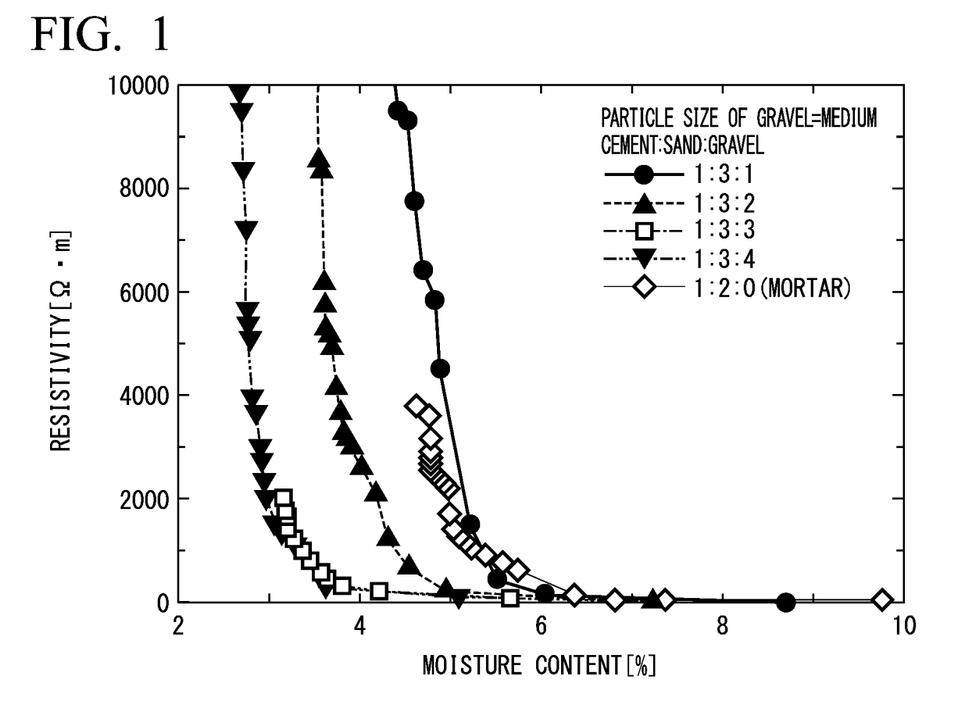
FIG. 1 is a view showing a relationship between a moisture content and a resistivity of concrete.

As shown in FIG. 1, the concrete is known to have resistive properties at the time of containing moisture. A mortar with the gravel removed from the concrete composition has the similar properties. Due to this property, the concrete or the mortar can be used as an electrode that temporarily has the electrical conductivity when it is impregnated with the water, electrolyzed water or the like to be brought into a wet state.

Figure 2:
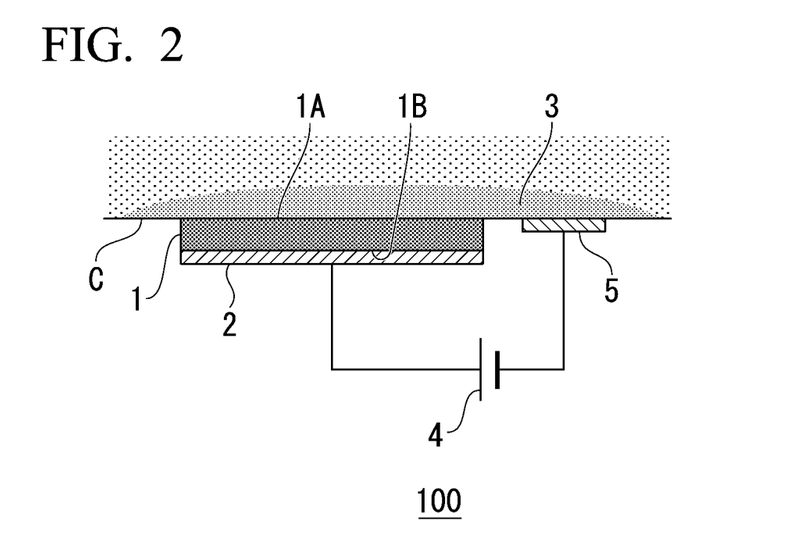
FIG. 2 is a cross-sectional view showing an assuming configuration in an adhesion and peeling according to a first embodiment.

As shown in FIG. 2, an adhesion/peeling device 100 used for the adhesion/peeling method comprises a sheet-shaped electrically peelable adhesive sheet 1, a first electrode 2 adhered to the electrically peelable adhesive sheet 1, a concrete C in a wet state in which a second electrode 3 is formed, and a power supply portion 4 configured to input a predetermined voltage between the first electrode 2 and the second electrode 3.

The electrically peelable adhesive sheet 1 is a sheet body having adhesiveness on a first surface 1A side and a second surface 1B side. The first surface 1A side of the electrically peelable adhesive sheet 1 is adhered to a predetermined position of the concrete C as a fixation target object. The second surface 1B side of the electrically peelable adhesive sheet 1 is adhered to the first electrode 2. The electrically peelable adhesive sheet 1 is formed of an electro-peeling adhesive whose adhesiveness is lowered due to an input of voltage.

The electro-peeling adhesive is, for example, an adhesive formed of an acrylic polymer, an ionic liquid containing an imidazolium salt or the like, and a transfer promoter. When the voltage is applied to the electro-peeling adhesive using an anode and a cathode, the imidazolium cations contained therein migrate to the cathode side. As a result, the hydrogen is generated at the cathode due to a reduction reaction. The generated hydrogen bubbles separate the electro-peeling adhesive from the cathode such that the adhesive strength of the electro-peeling adhesive on the cathode side is greatly reduced. The size of the generated hydrogen bubbles is about 1 μm to 100 μm.

Other materials may be used for the electrically peelable adhesive sheet 1 according to the present embodiment, as long as such materials have the electro-releasable properties that the adhesive strength is lowered based on the input of voltage. Depending on the different peeling mechanism, the electro-peeling adhesive has a pattern in which the peeling surface occurs on the anode side of the input voltage and a pattern in which the peeling surface occurs on the cathode side of the input voltage; however, according to the present embodiment, the electro-peeling adhesive having either property may be used. A voltage is input to the electro-peeling adhesive with a polarity such that the peeling surface is at the fixation target object side.

The first electrode 2 is made of a material having electrical conductivity. For example, a housing of a sensor or the like is adhered to the first electrode 2 as described later. The first electrode 2 is electrically connected to the anode side of the power supply portion 4. The first electrode 2 is adhered to the second surface 1B side of the electrically peelable adhesive sheet 1.

The second electrode 3 is a region in which a predetermined position of the concrete C is impregnated with a liquid such as water so as to be in a wet state, and the second electrode 3 is formed to have temporarily electrical conductivity in the state when the wet state is maintained. The liquid may contain either of conductive particles or an ionic electrolyte so as to enhance the electrical conductivity. The second electrode 3 is electrically connected to the cathode side of the power supply portion 4. The second electrode 3 is adhered to the first surface 1A side of the electrically peelable adhesive sheet 1. In a case of inputting the voltage to the second electrode 3, an auxiliary electrode 5 such as metal or a wetted sponge may be used.

Figure 3:
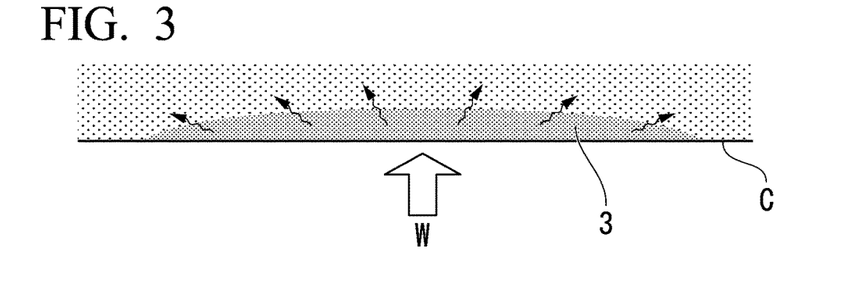
FIG. 3 is a cross-sectional view showing a step of an adhesion/peeling method according to the first embodiment.

As shown in FIG. 3, the predetermined position of the concrete C as the fixation target object is impregnated with a liquid such as water W to be in a wet state in advance. The water W is supplied to the predetermined location using means such as water spraying, water pouring, pressing a damp sponge thereto or the like. The water W permeates into the concrete C due to the capillary action. The second conductive electrode 3 is temporarily formed in the moistened area on the surface of the fixation target object at the predetermined position. At this time, the wet state and the electrical resistance of the second electrode 3 may be measured. In addition to the concrete and the mortar, the second electrode 3 may be formed of other materials such as gypsum, brick, tile, wood, stone, wallpaper, cloth material, artificial building materials and the like as long as the liquid is impregnated to temporarily maintain the wet state and the electrical conductivity can be achieved.

Figure 4:
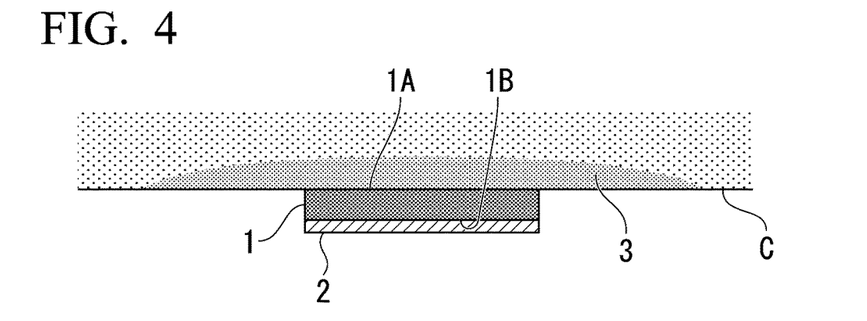
FIG. 4 is a cross-sectional view showing a step of an adhesion/peeling method according to the first embodiment.

As shown in FIG. 4, the first surface 1A side of the electrically peelable adhesive sheet 1 is adhered to the predetermined position of the concrete C on which the second electrode 3 is temporarily formed. The first electrode 2 is adhered to the second surface 1B of the electrically peelable adhesive sheet 1. The adherend is adhered to the first electrode 2. In the example of FIG. 4, the electrically peelable adhesive sheet 1 is formed such that the adhesiveness is lowered on the cathode side.

Figure 5:
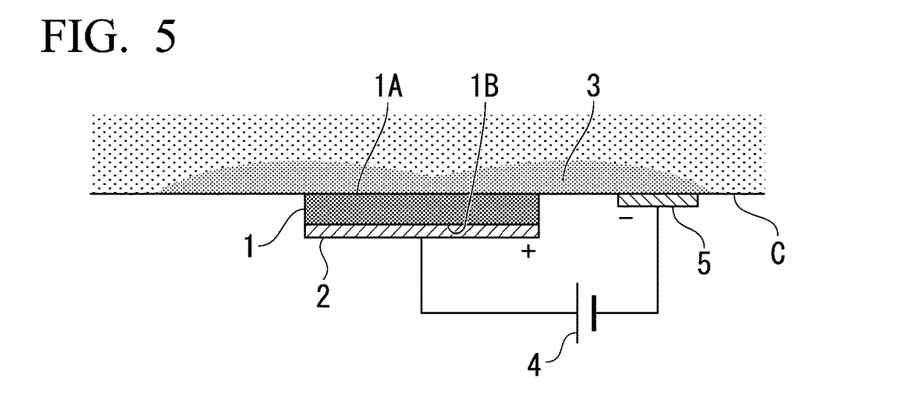
FIG. 5 is a cross-sectional view showing a step of an adhesion/peeling method according to the first embodiment.

As shown in FIG. 5, at the time of peeling off the electrically peelable adhesive sheet 1, a predetermined voltage is input between the first electrode 2 and the second electrode 3 by the power supply portion 4. The second electrode 3 achieves the electrical conductivity due to the ions dissolved in the water impregnated in the concrete C. An auxiliary electrode 5 may be provided between the power supply portion 4 and the second electrode 3. When the area of the second electrode 3 is large, one or more electrical contacts with the power supply portion 4 may be provided so as to reduce the potential gradient generated by the electrical resistance. It is desirable that the input voltage is, for example, equal to or larger than 5V and equal to or less than 100V. The power supply portion 4 inputs a voltage with a polarity such that the peeling surface of the electrically peelable adhesive sheet 1 is directed toward the concrete side. The Voltage is input by a direct current. The voltage may be input by an alternating current.

Figure 6:
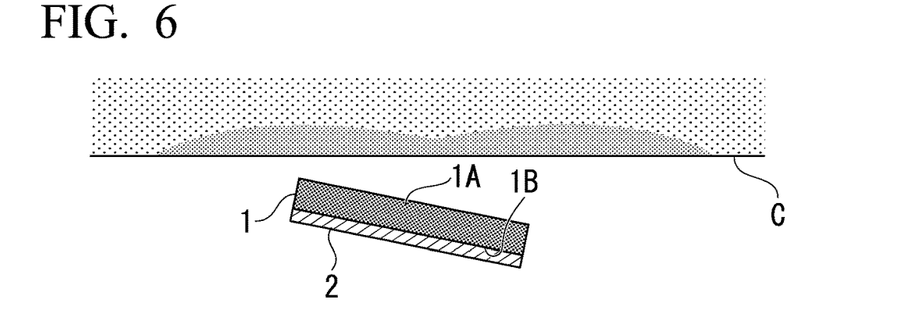
FIG. 6 is a cross-sectional view showing a step of an adhesion/peeling method according to the first embodiment.

As shown in FIG. 6, the adhesive force on the first surface 1A side of the electrically peelable adhesive sheet 1 decreases and the electrically peelable adhesive sheet 1 is peeled off from the surface of the concrete C. As a result, the electrically peelable adhesive sheet 1 can be peeled off from the concrete C together with the first electrode 2 without leaving any residue of the electrically peelable adhesive sheet 1 on the concrete C side. The concrete C can be restored to the original state due to the electrically peelable adhesive sheet 1. The wet concrete C in the wet state returns to the dry state by natural drying. The concrete C in the wet state may be returned to the dry state using a dryer. Based on the peeling of the electrically peelable adhesive sheet 1, the adherend on the first electrode 2 side can be collected.

An embodiment that as a modification example of the adhesion/peeling method according to the first embodiment will be described below. In the following description, the same names and reference signs are used for the same configurations as that in the first embodiment, and the duplicate descriptions are appropriately omitted.

Second Embodiment

In the steps of the adhesion/peeling method according to the first embodiment, the step of making the concrete C to be wet may be performed after the electrically peelable adhesive sheet 1 is adhered to the concrete C.

Figure 7:
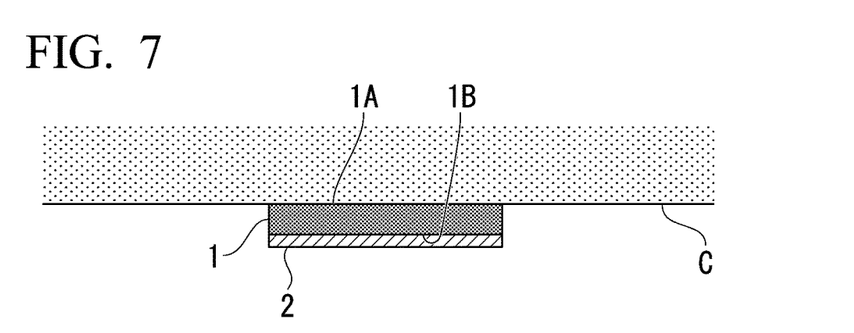
FIG. 7 is a cross-sectional view showing a step of an adhesion/peeling method according to a second embodiment.

As shown in FIG. 7, the first surface 1A side of the electrically peelable adhesive sheet 1 is directly adhered to the predetermined position of the concrete C in the dry state. The first electrode 2 is adhered to the second surface side 1B of the electrically peelable adhesive sheet 1.

Figure 8:
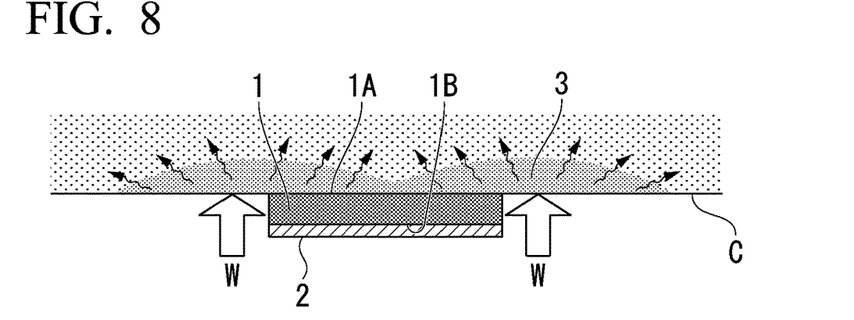
FIG. 8 is a cross-sectional view showing a step of an adhesion/peeling method according to the second embodiment.

As shown in FIG. 8, when the electrically peelable adhesive sheet 1 is peeled off, the concrete C around the electrically peelable adhesive sheet 1 is impregnated with the liquid such as the water W. Due to the capillary action of the water W, the area including the predetermined position of the concrete C becomes the wet state by the water W flowing around and permeating the area including the surface in contact with the first surface 1A of the electrically peelable adhesive sheet 1. The area in the wet state functions as the second electrode 3. The second electrode 3 is formed in a state in which the electrically peelable adhesive sheet 1 including the first electrode 2 (adherent) is adhered to the predetermined position of the concrete C.

Figure 9:
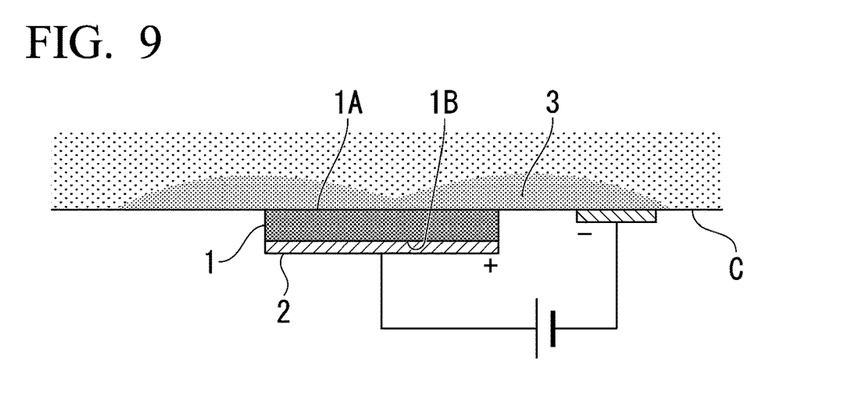
FIG. 9 is a cross-sectional view showing a step of an adhesion/peeling method according to the second embodiment.

As shown in FIG. 9, a predetermined voltage is input between the first electrode 2 and the second electrode 3 by the power supply portion 4. The second electrode 3 achieves the electrical conductivity due to ions dissolved in the water impregnated in the concrete C.

Figure 10:
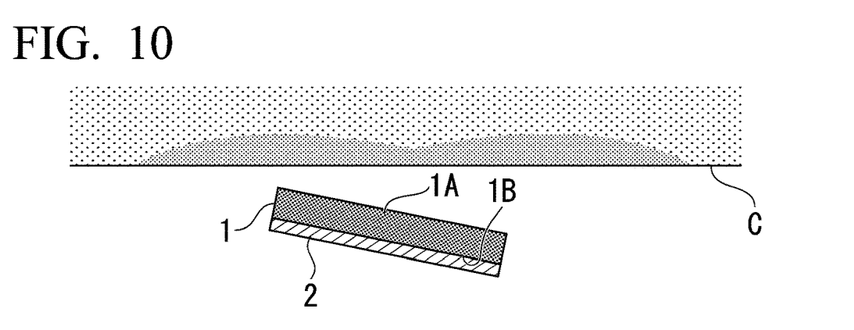
FIG. 10 is a cross-sectional view showing a step of an adhesion/peeling method according to the second embodiment.

As shown in FIG. 10, the adhesive force on the first surface 1A side of the electrically peelable adhesive sheet 1 decreases and the electrically peelable adhesive sheet 1 is peeled off from the surface of the concrete C. As a result, the electrically peelable adhesive sheet 1 can be peeled off from the concrete C together with the first electrode 2 without leaving any residue of the electrically peelable adhesive sheet 1 on the concrete C side. The adhesion peeling method described above may be used, for example, when an AE (Acoustic Emission) sensor for detecting elastic waves is adhered to the surface of a concrete structure, and then the AE sensor is peeled off after the structure is diagnosed.

Figure 11:
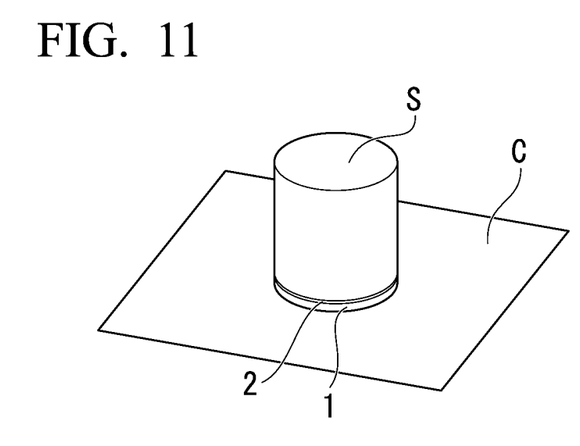
FIG. 11 is a perspective view showing an adhesion/peeling device before connecting a power supply portion according to the second embodiment.

As shown in FIG. 11, a cylindrical AE sensor S for detecting the elastic waves is adhered to the concrete C via the electrically peelable adhesive sheet 1 so as to diagnose the concrete structure. The AE sensor S is adhered to the concrete C. The AE sensor S is installed, for example, on a structure such as a bridge. In this case, the bridge becomes the fixation target object. The AE sensor S detects an elastic wave generated from the structure and converts the elastic wave into an AE signal (voltage signal).

Specifically, the AE sensor uses a piezoelectric element having a sensitivity in the range of 10 kHz to 1 MHz, for example. The AE sensors include a resonance type that has a resonance peak within a frequency range, a broadband type that suppresses resonance, and the like. Any type of AE sensor S may be used. Also, the AE sensor S may incorporate a preamplifier. Methods for detecting elastic waves by the AE sensor include a voltage output type, a resistance change type, a capacitance type, and the like, and any detection method may be used.

The AE sensor S has, for example, a sensitive surface on the bottom portion thereof. The first electrode 2 is adhered to the bottom portion. The AE sensor S and the first electrode 2 become the adherent objects with respect to the electrically peelable adhesive sheet 1. At this time, in a case in which the bottom portion of the AE sensor S is formed of a conductor such as metal, the bottom portion may be used as the first electrode 2. In a case in which the housing of the AE sensor S is formed integrally with the bottom portion, the housing may serve as the first electrode 2. In this case, the housing of the AE sensor S becomes the adherent object with respect to the electrically peelable adhesive sheet 1. The first electrode 2 is adhered to the second surface 1B side of the electrically peelable adhesive sheet 1. The first surface 1A side of the electrically peelable adhesive sheet 1 is adhered to the concrete C side. The AE sensor S, which detects the elastic waves propagating to a fixed object via the electrically peelable adhesive sheet adhered to the sensitive surface of the sensor, is removed after the measurement is completed.

Figure 12:
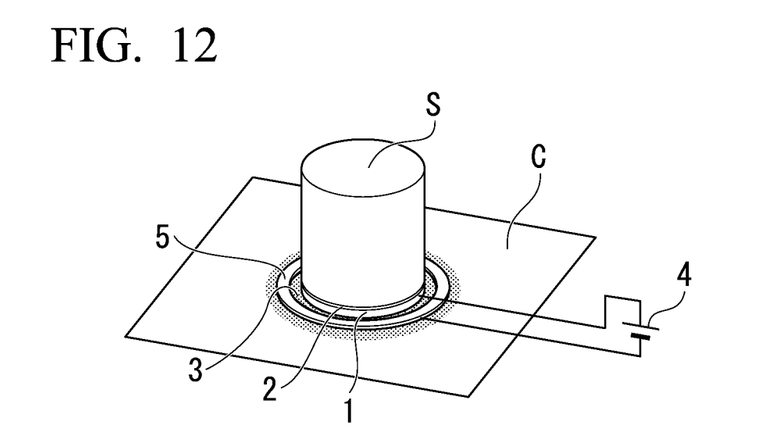
FIG. 12 is a perspective view showing the adhesion/peeling device after connecting the power supply portion according to the second embodiment.

As shown in FIG. 12, when the AE sensor S is removed, the concrete C around the electrically peelable adhesive sheet 1 is supplied with a liquid, such as water W, which serves as an electrolytic solution. The concrete C around the electrically peelable adhesive sheet 1 is impregnated with water W and becomes the wet state so as to form the second electrode 3 having the electrical conductivity. The power supply portion 4 is electrically connected to the first electrode 2 and the second electrode 3. A voltage is input between the first electrode 2 and the second electrode 3. The second electrode 3 may be provided with an annular auxiliary electrode 5. The auxiliary electrode 5 is, for example, formed in a dimension extending around the electrically peelable adhesive sheet 1 without coming into contact therewith. The voltage can be input by the auxiliary electrode 5 such that the second electrode 3 around the electrically peelable adhesive sheet 1 has the same potential.

The power supply portion 4 inputs the voltage so as to decrease the adhesive strength of the surface side of the electrically peelable adhesive sheet 1 in contact with the concrete C. In the example as shown in FIG. 12, the electrically peelable adhesive sheet 1 is configured so as to decrease the adhesive strength on the cathode side, and the cathode is connected to the second electrode 3 side. By inputting the voltage to the auxiliary electrode 5 and the housing of the AE sensor S or the first electrode 2, the electrically peelable adhesive sheet 1 can be peeled off from the concrete C without leaving any residue. According to the adhesion/peeling method of an object described above, the non-destructive inspection can be performed without leaving any residue such as the adhesive or the like on the fixation target object.

In the second embodiment, the electrically peelable adhesive sheet 1 may be formed in a striped pattern or a matrix pattern in which passages for the water W are formed therein such that the water W can easily permeate between the first electrode 2 and the concrete C. In this case, the path of the water W may be filled with a member that promotes the capillary action such as a fibrous sheet, a porous body or the like. According to the adhesion/peeling method according to the second embodiment, it is possible to make the fixation target object to have the electrical conductivity and perform the electro-peeling from the electrically peelable adhesive sheet 1 having the electrical peelability by making the fixation target object of the porous body such as the concrete C to be in the wet state.

Third Embodiment

Figure 13A:
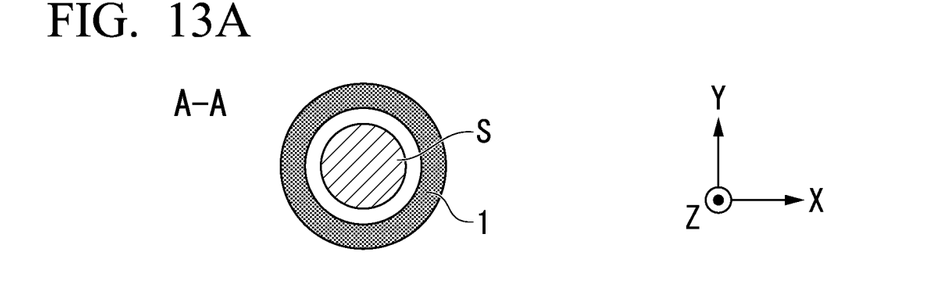
FIGS. 13A and 13B are perspective views showing an adhesion/peeling device before connecting a power supply portion according to a third embodiment.
Figure 13B:
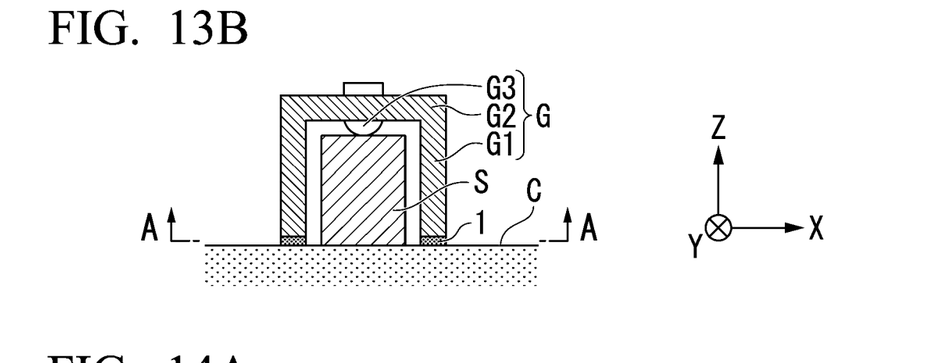

As shown in FIG. 13, the AE sensor S may be adhered to the concrete C via a fixing member G. The fixing member G is formed in a cylindrical shape that covers the AE sensor S, for example. The fixing member G includes, for example, a cylindrical portion G1 having a diameter larger than that of the AE sensor S, and a disk-shaped lid portion G2 that covers the top portion of the cylindrical portion G1. A pressing member G3 that presses the AE sensor S toward the concrete C side is provided on the lid portion G2. The pressing member G3 is made of, for example, an elastic body such as an elastically deformable rubber. The fixing member G is made of, for example, a conductive material such as metal.

A cylindrical portion G1 of the fixing member G has an annular lower end portion. The electrically peelable adhesive sheet 1 is, for example, formed in an annular shape to match the shape of the lower end of the cylindrical portion G1. The fixing member G is adhered to the concrete C with the electrically peelable adhesive sheet 1 interposed therebetween. By adhering the fixing member G holding the AE sensor S to the second surface side of the electrically peelable adhesive sheet 1, it is possible to hold the AE sensor S with respect to the concrete C (fixation target object) via the fixing member G. In a state in which the fixing member G fixed, the AE sensor S is pressed by the pressing member G3 in a direction in which the bottom portion contacts the concrete C.

The fixing member G is not limited to the shape described above, and may be formed in a shape that partially covers the AE sensor S such as a gate type, a cantilever type or the like as long as the AE sensor S can be held while being in contact with the concrete C.

Figure 14A:
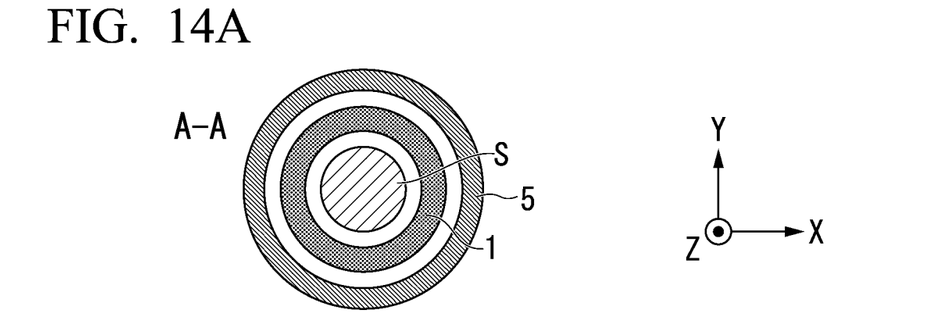
FIGS. 14A and 14B are perspective views showing the adhesion/peeling device after connecting the power supply portion according to the third embodiment.
Figure 14B:
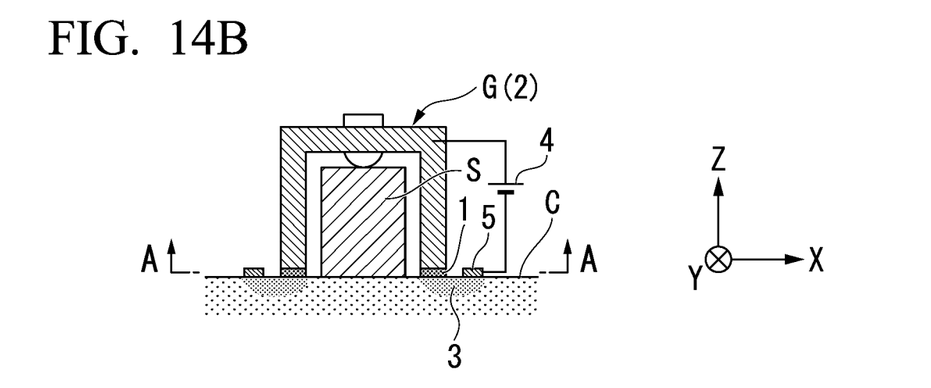

As shown in FIG. 14, the annular auxiliary electrode 5 is installed around the electrically peelable adhesive sheet 1 on the surface of the concrete C when the AE sensor S is removed. The auxiliary electrode 5 is, for example, formed in a dimension extending around the electrically peelable adhesive sheet 1 without being in contact therewith. A liquid such as water W that serves as the electrolytic solution is supplied to the concrete C around the electrically peelable adhesive sheet 1. The concrete C around the electrically peelable adhesive sheet 1 is impregnated with the water W and becomes the wet state so as to form the second electrode 3 having the electrical conductivity. Based on the supply of the water W, the auxiliary electrode 5 is in the electrical contact with the second electrode 3.

The power supply portion 4 is electrically connected to the fixing member G (first electrode 2) and the auxiliary electrode 5. The voltage is input from the power supply portion 4 between the fixing member G (first electrode 2) and the auxiliary electrode 5 (second electrode 3). The voltage can be input to make the second electrode 3 around the electrically peelable adhesive sheet 1 to have the same potential by the auxiliary electrode 5.

The power supply portion 4 inputs the voltage so as to decrease the adhesive strength of the surface side of the electrically peelable adhesive sheet 1 that contacts the concrete C. By applying the voltage to the auxiliary electrode 5 and the fixing member G (first electrode 2), the electrically peelable adhesive sheet 1 can be peeled off from the concrete C without leaving any residue. According to the adhesion/peeling method of an object described above, the non-destructive inspection can be performed without leaving any residue such as the adhesive or the like on the fixation target object.

Fourth Embodiment

Figure 15:
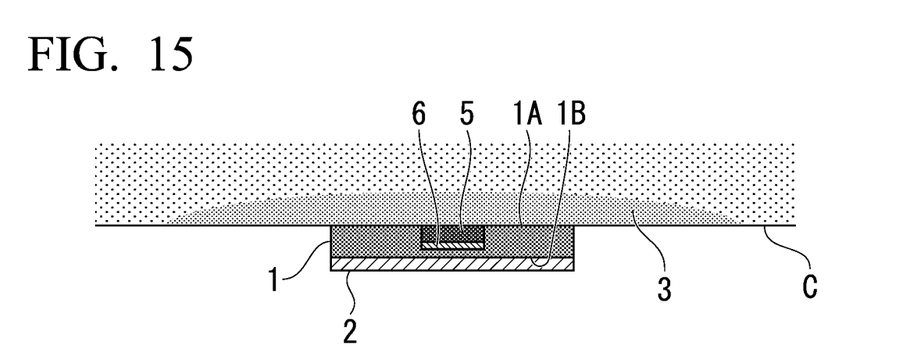
FIG. 15 is a perspective view showing an adhesion/peeling device before connecting a power supply portion according to a fourth embodiment.

As shown in FIG. 15, the auxiliary electrode 5 may be provided in advance on the adhesive surface side (first surface 1A side) of the electrically peelable adhesive sheet 1 to be adhered to the fixation target object. The auxiliary electrode 5 is formed with a width smaller than that of the first electrode 2. A non-conductor 6 is provided between the auxiliary electrode 5 and the electrically peelable adhesive sheet 1. The non-conductor 6 can prevent the peeling from occurring between the auxiliary electrode 5 and the electrically peelable adhesive sheet 1 when the voltage is input between the first electrode 2 and the second electrode 3.

In each of the above-described embodiments, the adhesion/peeling method may include a step of measuring at least one of the electrical resistance value and the moisture content of the fixation target object, and the humidity in the atmosphere. Based on these measured values, in a case in which it is determined that the fixation target object is sufficiently moist due to rainfall in the natural environment, and the second electrode is generated in the natural environment, the step of impregnating with liquid at the predetermined position may be omitted, and the predetermined voltage may be input between the first electrode and the second electrode.

The adhesion/peeling method according to the above-described embodiments may be performed based on a remote control of mobile installation means such as a drone or the like. The adhesion/peeling method using the remote control is suitable for temporarily installing a sensor on a large structure such as a bridge or the like. In the adhesion/peeling method based on the remote control, the voltage input to the first electrode 2 and the second electrode 3 may be performed by the wireless power supply. In this case, a coil sensor electrically connected to the first electrode 2 and the second electrode 3 may be provided, and an alternating magnetic field may be emitted from the drone toward the coil sensor so as to generate an induced current in the coil sensor. Between the coil sensor and the first electrode 2, the second electrode 3, a frequency conversion circuit, a DC conversion circuit or the like for converting the frequency of the AC voltage input to the first electrode 2 and the second electrode 3 may be provided.

According to at least one embodiment described above, the adhesion/peeling method includes adhering a first surface side of an electrically peelable adhesive sheet to a predetermined position of a concrete C, wherein the electrically peelable adhesive sheet is formed of an electro-peeling adhesive that has adhesiveness on the first surface side and a second surface side and the adhesiveness of the electrically peelable adhesive sheet decreases based on the input of voltage, adhering a first electrode of an AE sensor having the first electrode formed of a conductor to the second surface side of the electrically peelable adhesive sheet, containing water W at the predetermined position and temporarily forming a second electrode with conductivity on the surface of the concrete C at the predetermined position, and inputting a predetermined voltage between the first electrode and the second electrode so as to remove the electrically peelable adhesive sheet from the concrete C. Accordingly, it is possible to remove the residue after adhering the adherend to the concrete C by peeling off the electrically peelable adhesive sheet from the concrete C.

As described above, according to the adhesion/peeling method, even if the fixation target object such as the concrete or the like is non-conductive, the adherend adhered to the fixation target object can be electrically peeled without leaving any residue.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An adhesion/peeling method, comprising:
   adhering a first surface side of an electrically peelable adhesive sheet to a predetermined position of a fixation target object, wherein the electrically peelable adhesive sheet is formed of an electro-peeling adhesive having adhesiveness on the first surface side and a second surface side thereof, and the adhesiveness of the electro-peeling adhesive is lowered due to an input of a voltage;
   adhering a first electrode of an adherend including the first electrode formed of a conductor to the second surface side of the electrically peelable adhesive sheet;
   containing a liquid at the predetermined position of the fixation target object to temporarily form a second electrode with conductivity on a surface of the fixation target object, the liquid being impregnated into the fixation target; and
   inputting a predetermined voltage between the first electrode and the second electrode to peel of the electrically peelable adhesive sheet from the fixation target object,
   wherein the adherend is a sensor detecting elastic waves, and
   the elastic waves transferred to the fixation target object are detected via the electrically peelable adhesive sheet adhered to a sensitive surface of the sensor.

2. The adhesion/peeling method according to claim 1, wherein the second electrode is formed in a state in which the adherend is adhered to the predetermined position.

3. The adhesion/peeling method according to claim 1, wherein the liquid is water.

4. The adhesion/peeling method according to claim 1, further comprising:

holding the sensor with respect to the fixation target object by adhering a fixing member having conductivity and holding the sensor to the second surface side of the electrically peelable adhesive sheet;

making an auxiliary electrode having the conductivity to come into electrical contact with the second electrode; and inputting the predetermined voltage between the fixing member and the auxiliary electrode.

5. An adhesion/peeling method, comprising:

adhering a first surface side of an electrically peelable adhesive sheet to a predetermined position of a fixation target object, wherein the electrically peelable adhesive sheet is formed of an electro-peeling adhesive having adhesiveness on the first surface side and a second surface side thereof, and the adhesiveness of the electro-peeling adhesive is lowered due to an input of a voltage;

adhering a first electrode of an adherend including the first electrode formed of a conductor to the second surface side of the electrically peelable adhesive sheet;

containing a liquid at the predetermined position of the fixation target object to temporarily form a second electrode with conductivity on a surface of the fixation target object, the liquid being impregnated into the fixation target; and inputting a predetermined voltage between the first electrode and the second electrode to peel of the electrically peelable adhesive sheet from the fixation target object, wherein the liquid at least includes either of conductive particles or an ionic electrolyte.

6. An adhesion/peeling method, comprising:

adhering a first surface side of an electrically peelable adhesive sheet to a predetermined position of a fixation target object, wherein the electrically peelable adhesive sheet is formed of an electro-peeling adhesive having adhesiveness on the first surface side and a second surface side thereof, and the adhesiveness of the electro-peeling adhesive is lowered due to an input of a voltage;

adhering a first electrode of an adherend including the first electrode formed of a conductor to the second surface side of the electrically peelable adhesive sheet;

containing a liquid at the predetermined position of the fixation target object to temporarily form a second electrode with conductivity on a surface of the fixation target object, the liquid being impregnated into the fixation target; and inputting a predetermined voltage between the first electrode and the second electrode to peel of the electrically peelable adhesive sheet from the fixation target object, wherein the fixation target object is formed of a concrete or a mortar.

* * * * *

UNITED STATES PATENT AND TRADEMARK OFFICE
CERTIFICATE OF CORRECTION

| | | |
|---|---|---|
| PATENT NO. | : 12,116,513 B2 | Page 1 of 1 |
| APPLICATION NO. | : 17/929431 | |
| DATED | : October 15, 2024 | |
| INVENTOR(S) | : Usui et al. | |

It is certified that error appears in the above-identified patent and that said Letters Patent is hereby corrected as shown below:

On the Title Page

• Item (57) Abstract, Line 16, "to peel of" should read as —to peel off—.

In the Claims

• Claim 1, Column 8, Line 54, "to peel of" should read as —to peel off—.

• Claim 5, Column 10, Line 2, "to peel of" should read as —to peel off—.

• Claim 6, Column 10, Line 23, "to peel of" should read as —to peel off—.

Signed and Sealed this
Tenth Day of December, 2024

Katherine Kelly Vidal
*Director of the United States Patent and Trademark Office*